June 14, 1955 C. A. DAHLBOM ET AL 2,710,892
SPEECH TRANSMISSION SYSTEM
Filed May 20, 1949 8 Sheets-Sheet 1

INVENTORS C. A. DAHLBOM
A. WEAVER
BY R. C. Lerry
ATTORNEY

June 14, 1955 C. A. DAHLBOM ET AL 2,710,892

SPEECH TRANSMISSION SYSTEM

Filed May 20, 1949 8 Sheets-Sheet 2

INVENTORS C. A. DAHLBOM A. WEAVER

BY R. C. Perry

ATTORNEY

June 14, 1955 C. A. DAHLBOM ET AL 2,710,892

SPEECH TRANSMISSION SYSTEM

Filed May 20, 1949 8 Sheets-Sheet 3

INVENTORS C.A. DAHLBOM
A. WEAVER
BY R. C. Terry
ATTORNEY

INVENTORS C. A. DAHLBOM
A. WEAVER
BY R. C. Lerry
ATTORNEY

INVENTORS C. A. DAHLBOM
A. WEAVER
BY R. C. Perry
ATTORNEY

INVENTORS C. A. DAHLBOM
A. WEAVER
BY R. C. Perry
ATTORNEY

June 14, 1955 C. A. DAHLBOM ET AL 2,710,892

SPEECH TRANSMISSION SYSTEM

Filed May 20, 1949 8 Sheets-Sheet 8

INVENTORS C. A. DAHLBOM
A. WEAVER
BY R. C. Perry
ATTORNEY

United States Patent Office 2,710,892

Patented June 14, 1955

2,710,892

SPEECH TRANSMISSION SYSTEM

Carl A. Dahlbom, Brooklyn, and Allan Weaver, Port Washington, N. Y., assignors to Bell Telephone Laboratories, Incorporated, New York, N. Y., a corporation of New York Application May 20, 1949, Serial No. 94,427

10 Claims. (Cl. 179—15)

The present invention relates to communication apparatus and methods and is particularly applicable to electronic commutators and distributors having utility in communication systems. Certain features of the invention may be applied generally to systems for transmitting information from a plurality of sources to a plurality of output points, in sequence, over a common channel. While the invention will be illustrated in connection with a particular type of voice communication system, and has certain particular advantages in this embodiment, it is also applicable generally to telephone and telegraph systems of the time-division multiplex type, to telemetering systems, and to synchronizing systems.

Reference may be made to Patent 2,098,956 granted November 16, 1937, to Homer W. Dudley, for a disclosure of one type of voice communication system which has sometimes been referred to as a vocoder. In the Dudley system there is described at the transmitting station means for receiving speech signals, means for analyzing the speech signals into ten frequency bands, and means for generating ten slowly varying unidirectional voltages, one for each of the previously-mentioned bands of frequencies in the speech signal. The magnitude of each of the generated voltages is, at any instant, representative of the energy present in the corresponding band of frequencies in the speech signal. There is also provided at the transmitter, means for generating an eleventh slowly varying unidirectional voltage the magnitude of which is proportional to the pitch or frequency of the fundamental of the speech signal. The eleven significant voltages are, in the Dudley system, transmitted in sequence over a common transmission channel with the aid of a mechanical commutator at the transmitting station and a mechanical distributor at the receiving station. These voltages are employed at the receiver to control the synthesis of a speech signal corresponding to the original speech signal.

In the present application there will be described a communication system employing an electronic commutator at the transmitting station, an electronic distributor at the receiving station, and electronic means for synchronizing the distributor with the commutator.

An object of the present invention is to provide a high-speed electronic commutator, an electronic distributor, and synchronizing means therefor.

Another object of the invention is to provide a communication system employing transmission by time division with the aid of electronic commutating means.

A further object of the invention is to provide a communication system employing a start-stop electronic distributor at the receiving station.

A feature of one embodiment of the invention is the provision at a transmitting station of an oscillator-controlled, closed ring of multivibrators for generating a series of gate voltages in sequence, these gate voltages being employed to perform a commutating function by controlling a series of gate circuits, and the provision at a receiving station of a chain or open-ended ring of multivibrators adapted to generate a series of gate voltages in sequence, these gate voltages performing a distributing function by controlling a series of gate circuits. At the transmitting station, the ring of multivibrators includes, in addition to multivibrators for controlling the gate circuits which perform the actual commutating function, multivibrators means adapted to generate a synchronizing voltage pulse. At the receiving station, this voltage pulse triggers the first multivibrator in the chain and energizes an oscillator which controls the other multivibrators, triggering them in sequence. Actuation of the last multivibrator in the chain serves to stop this oscillator, which remains stopped until the arrival of the next synchronizing pulse. Each synchronizing pulse serves to synchronize the gating or distributing operation at the receiver with the gating or commutating operation at the transmitter. In a preferred embodiment the gate voltages generated at the receiver are of shorter duration than those at the transmitter and are so phased that they cause a sampling of only the central portion of each of the successive received intelligence-transmitting voltage impulses.

The above-mentioned, as well as other objects, together with the many advantages obtainable by the practice of the present invention, will be readily comprehended by persons skilled in the art by reference to the following detailed description taken in connection with the annexed drawings which respectively describe and illustrate a preferred embodiment of the invention, and wherein Figs. 1 through 5 together comprise a schematic circuit diagram of a voice communication system, including an analyzer, an electronic commutator, a transmission channel, an electronic distributor, a synthesizer, and synchronizing means;

Figure 7:
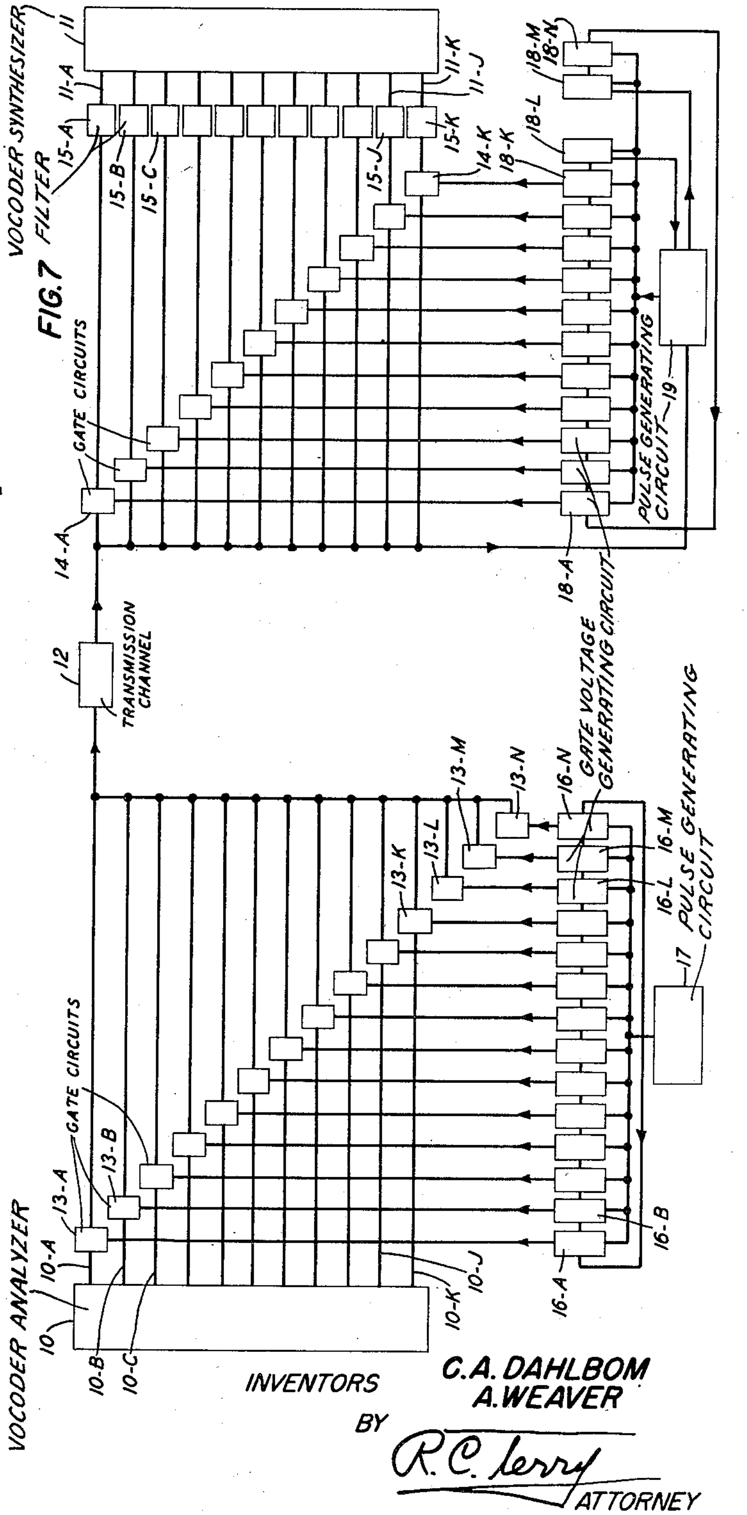
Fig. 7 is a schematic representation, in block diagram, of a system such as that shown in Figs. 1 through 5.

For a general understanding of the system to be described, reference may first be made to Fig. 7. There is shown in this figure an analyzer 10 at a transmitting station, and a synthesizer 11 at a receiving station. The analyzer and the synthesizer may be of the general type disclosed in the previously-mentioned Dudley patent. The analyzer 10 of the present application is adapted to receive a voice frequency signal, such as human speech, and to generate, in ten different leads, designated by reference numerals 10–A to 10–J, inclusive, slowly varying direct-current voltages representative of the instantaneous value of the energy in ten different frequency bands of the speech signal entering the vocoder analyzer 10. The analyzer also generates in a lead 10–K a direct-current voltage representative of the fundamental frequency of the speech signal.

The synthesizer 11 is provided with ten input leads 11–A to 11–J to which it is desired to apply direct-current voltages corresponding to those appearing in the leads 10–A to 10–J, and there is also provided an eleventh input lead, 11–K, for the synthesizer, to which it is desired to apply a voltage corresponding to that appearing in the lead 10–K. With such voltages applied to its input leads, the synthesizer 11 is adapted to produce a sound similar to that entering the analyzer 10.

The transmitter system is coupled to the receiver system over a single transmission channel 12. Each of the output leads 10–A to 10–K of the analyzer is connected, through a gate circuit in series with it, to an input terminal of the transmission channel 12. These various gate circuits may be designated by the reference numerals 13–A to 13–K, inclusive.

The output terminal of the transmission channel 12 is connected to each of the eleven input leads of the synthesizer 11 through a different gate circuit and a low-pass filter. These gate circuits are designated by reference numerals 14–A to 14–K, and the filters, 15–A to 15–K.

The transmitter system includes a series of gate voltage-generating circuits 16–A to 16–K, respectively associated with the gate circuits 13–A to 13–K, for controlling the same. Each of the gate voltage-generating circuits includes a multivibrator.

The transmitter system also includes means for generating a synchronizing pulse. Such means includes three gate circuits 13–L, 13–M and 13–N, and three corresponding gate voltage-generating circuits 16–L, 16–M and 16–N. Applied to the input terminal of the gate circuits 13–L and 13–N are constant voltages of low or approximately zero, value. Applied to an input terminal of the gate circuit 13–M is a constant voltage of such polarity and magnitude that when this gate circuit is energized, a large positive voltage is applied to the transmission channel.

The various gate voltage-generating circuits 16–A through 16–N are actuated in succession. They consequently generate gates in such a timed relationship as effectively to connect the leads 10–A to 10–K to the transmission circuit, individually, in succession. More particularly, they connect first the lead 10–A, then the lead 10–B, then the lead 10–C, and so on. After they connect the lead 10–K, they energize in succession, the gate circuits 13–L, 13–M and 13–N, thereby applying to the transmission circuit a positive voltage pulse or gate, useful in synchronizing the receiver. This synchronizing pulse is actually applied by the gate circuit 13–M. The gate circuits 13–L and 13–N serve to apply to the transmission circuit a markedly different voltage condition, such as zero voltage, so that the synchronizing pulse will represent a greater change of condition and may consequently be more readily identified.

In order that they may be actuated in succession, the gate voltage-generating circuits 16–A to 16–N are connected in a closed ring-like arrangement.

There is provided an oscillator-controlled pulse-generating circuit 17, adapted to generate a continuous train of energizing pulses of, for example, 25 microseconds duration, having a repetition rate of, say, 440 pulses per second. These pulses are applied to all the gate voltage-generating circuits 16–A to 16–N.

By an arrangement to be described later, any one gate voltage-generating circuit may be triggered only when it first receives a "preparing" gate voltage from the preceding gate voltage-generating circuit, and then receives a triggering pulse from the pulse-generating circuit 17. All the gate voltage-generating circuits 16–A to 16–N may initially be assumed to be in an "unprepared" condition. To start the system, one of them, for example 16–M, is manually operated so as to prepare circuit 16–N. It may be seen that thereafter only one of the gate voltage-generating circuits will respond to the oscillator at any given moment, this circuit being the one which has just been "prepared" by its preceding gate voltage-generating circuit. The gate voltage-generating circuits will, as a result, serve to energize the gate circuits 13–A to 13–N in sequence.

At the receiving station there is provided a series of gate voltage-generating circuits 18–A to 18–K, for controlling the gate circuits 14–A to 14–K, and a series of circuits 18–L, 18–M and 18–N serving a synchronizing function. There is additionally provided an oscillator-controlled pulse-generating circuit 19 for controlling the gate voltage-generating circuits 18–A to 18–N. The signal from the output terminal of the transmission circuit 12 is applied to the pulse-generating circuit 19 as well as to the gate circuits 14–A to 14–K. The oscillator of the pulse-generating circuit 19 is of the start-stop type. The synchronizing pulse, transmitted by the element 13–M, causes the circuit 18–M to be triggered, and serves to start the oscillator, thereby initiating a train of pulses for triggering the other gate voltage-generating circuits, namely 18–N and 18–A to 18–L. Any one of the circuits 18–M and 18–A to 18–L may be triggered only when the preceding gate voltage-generating circuit has first been triggered and a pulse from the pulse-generating circuit 19 is thereafter received. The frequency of the pulse-generating circuit 19 at the receiver is substantially the same as that of the pulse-generating circuit 17 at the transmitter. The gate circuits 14–A through 14–K at the receiver are thus synchronized with the gate circuits 16–A to 16–N at the transmitter, whereby the intelligence-transmitting voltage impulses received over the transmission circuit are applied to the correct input leads of the synthesizer 11. The oscillator of the pulse-generating circuit 19 is stopped by actuation of the last gate voltage-generating circuit 18–K, and it remains stopped until occurrence of the next synchronizing pulse.

*Detailed description*

The circuit may now be considered in more detail. Reference may now be made to Figs. 1 to 5, associated together in the manner indicated in Fig. 6, as a complete system of the type just described in connection with Fig. 7.

Figure 8:
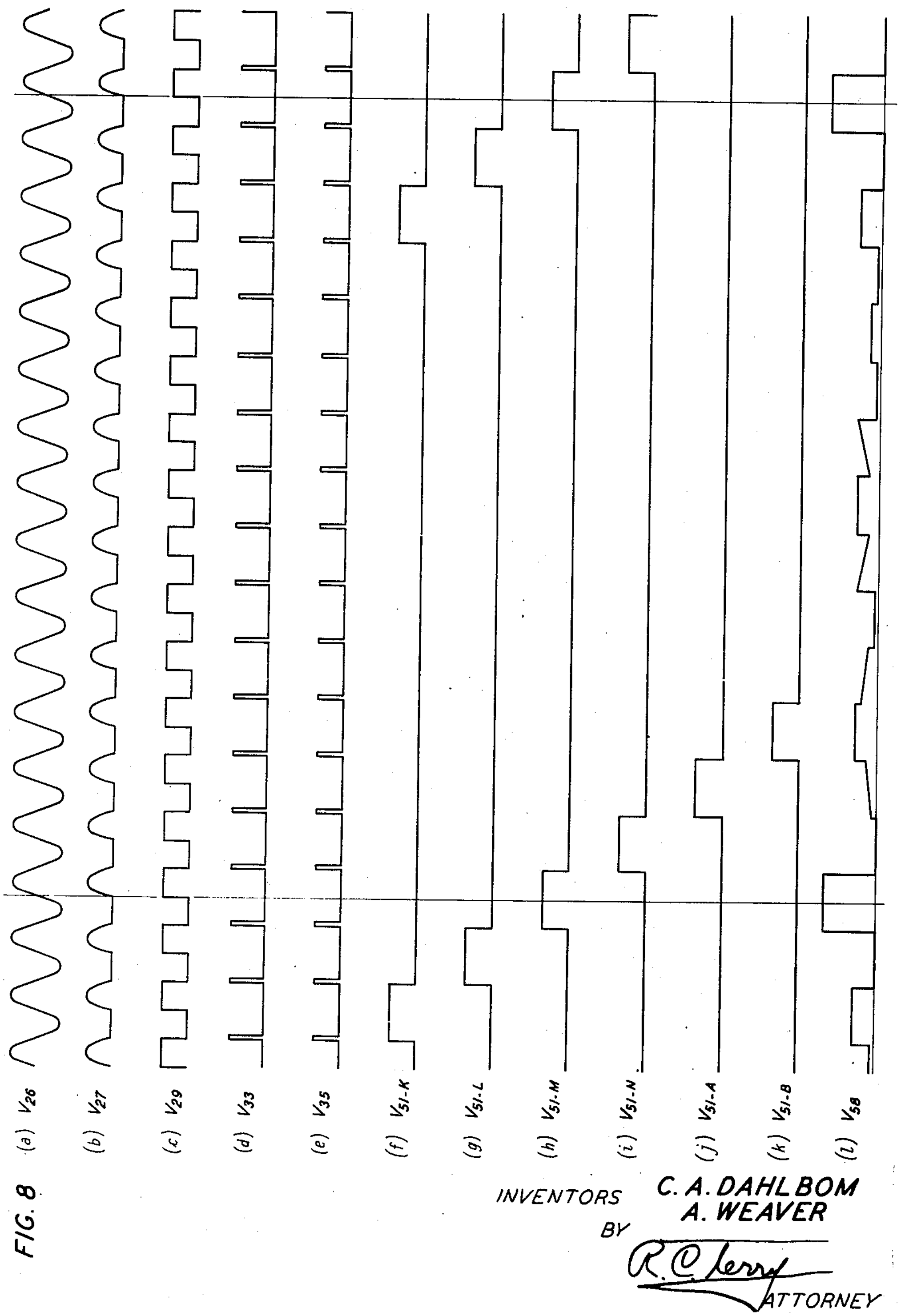
Fig. 8 is a series of timing diagrams of voltages at various points in apparatus at the transmitting station.
Figure 9:
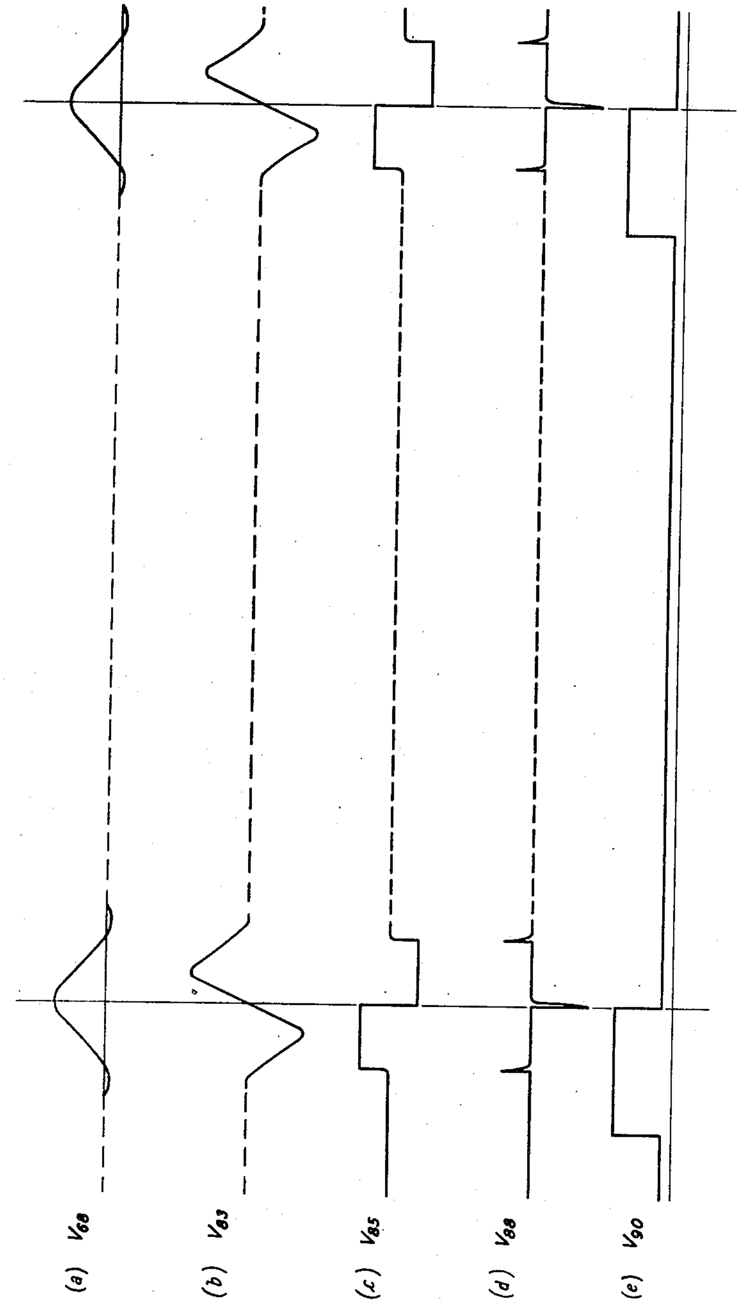
Figs. 9 and 10 are timing diagrams of voltages at various points in apparatus at the receiving station.
Figure 10:
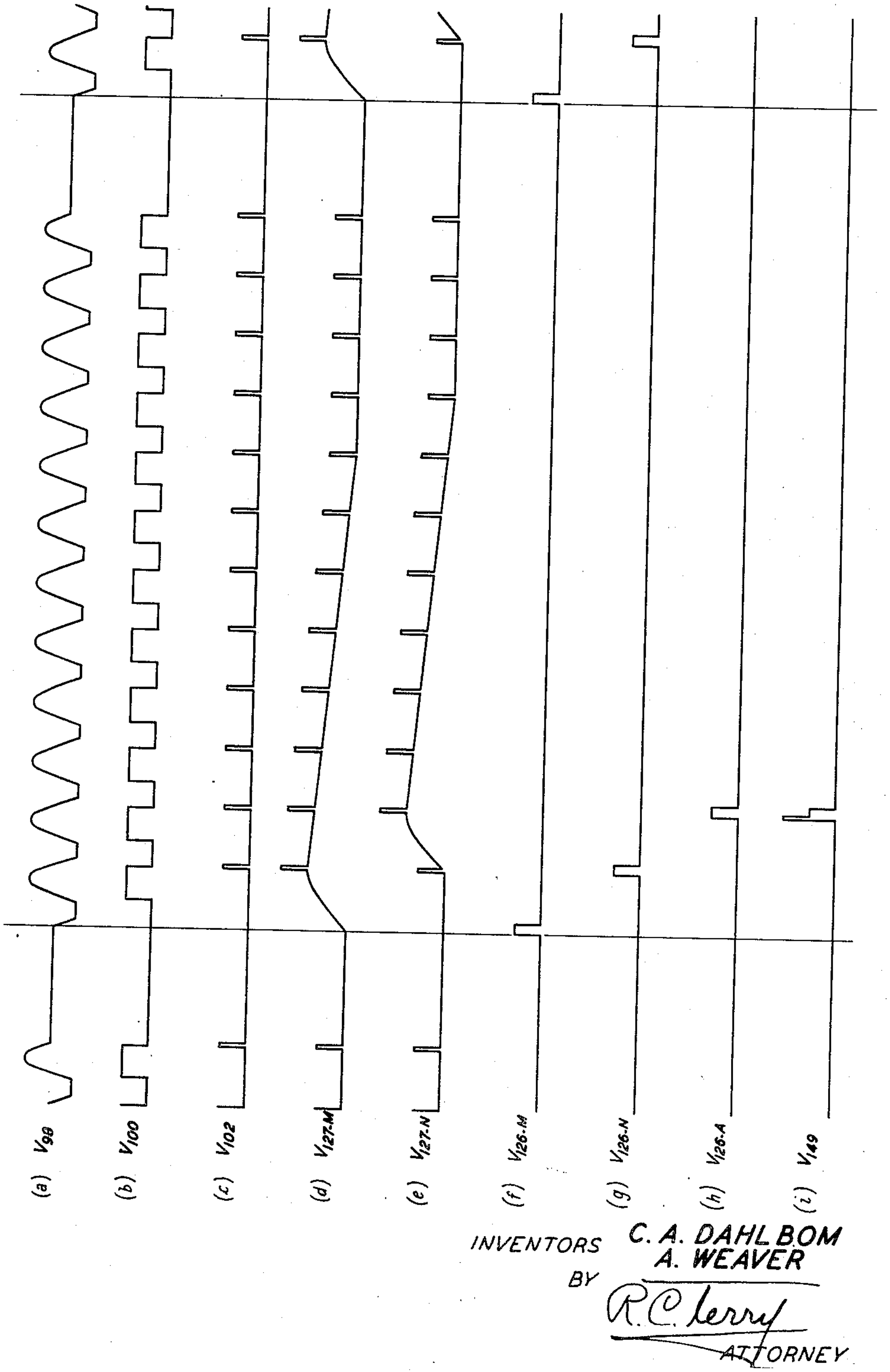

In Figs. 8, 9, and 10, to which reference will be made in connection with the explanation of Figs. 1 to 5, voltages at various points are plotted on a vertical axis, against time on a horizontal axis. In Figs. 8 to 10 these points are identified by a numerical subscript following the letter "V."

Figure 4:
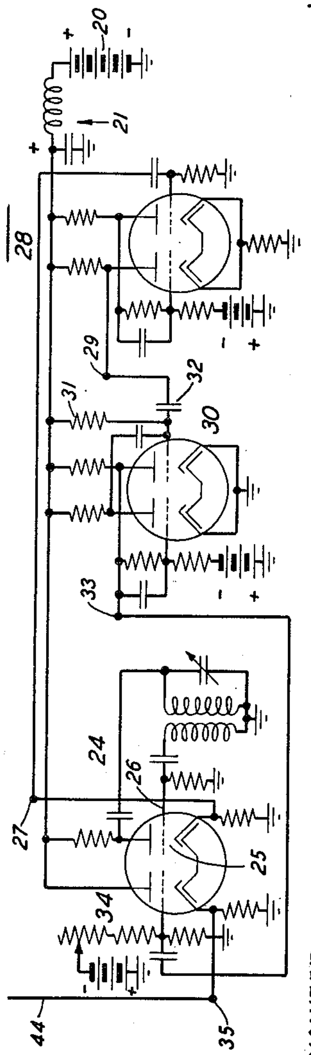

In Fig. 4 there is shown a source of B-supply voltage, illustrated as a battery 20, and a filter 21 comprising a series inductor and shunt condenser.

An oscillator 24, together with certain amplifying, clipping and pulse-forming circuits to be described, corresponds generally to the circuit element 17 mentioned in connection with the block diagram in Fig. 7.

The oscillator 24 comprises a triode 25 forming the right-hand half of a double triode and associated circuits of a conventional type for producing oscillation and determining the frequency thereof. This frequency may be, for example, about 440 cycles per second. The circuit constants are so chosen that the triode 25 is biased approximately to cut-off. The voltage on the control grid 26 will be sinusoidal, as shown in Fig. 8(*a*). The output signal from the oscillator is derived across a resistor in its cathode circuit. The wave form of this output voltage, at a point 27, is approximately in the shape of a half-wave-rectified sinusoid, as is illustrated in Fig. 8(*b*).

This signal from the oscillator 24 is applied to an amplifier-clipper 28, including two triodes. The triodes have a common cathode circuit, comprising an unbypassed resistor which serves to provide positive feedback, thereby steepening the sides of the resulting signal. The right-hand triode serves primarily as an amplifier. The grid of the left-hand triode is driven below cut-off when the voltage at the point 27 is in the more positive portion of its excursions. As a result the output voltage from the amplifier-clipper 28 at a point 29 is approximately a square wave, as is shown in Fig. 8(*c*).

The succeeding stage is a pulse generator 30 comprising a multivibrator of the single-shot or single-trip type, which is, per se, well known. The input grid of the right-hand triode is biased to a large positive potential through a resistor 31, which in the illustrative circuit is connected to the positive B-supply potential source, and consequently this triode is normally in a conducting condition. The resulting low voltage applied from the anode of the right-hand triode to the grid of the left-hand triode, along with a source of negative bias for this grid, serves to hold the left-hand triode normally cut off. The signal from the amplifier-clipper 28 is applied to the input grid of the pulse generator 30 through a small condenser 32. When this signal drops from its maximum positive value toward a less positive value, it cuts off the right-hand triode of the pulse generator, thereby suddenly raising its anode potential, turning on the left-hand triode. The left-hand plate of the condenser 32, and hence the grid of the right-hand triode, rises in potential as this condenser plate charges toward the positive B-supply potential. When this grid reaches a potential at which anode current flows in the right-hand triode, the multivibrator quickly returns to its original condition and the anode of the right-hand triode falls in potential. Circuit constants may be so chosen that the resulting positive pulse produced at an output point 33 connected to the anode of the right-hand triode is about 25 microseconds in duration. The wave form of the voltage at this point is illustrated in Fig. 8(*d*).

The output signal from the pulse generator 30 is applied to a cathode follower or pulse amplifier 34, which is illustrated as the left-hand half of the twin triode of which the triode 25 comprises the right-hand half. The grid of the pulse amplifier 34 is normally biased below cut-off. As a result, the positive 25-microsecond pulses are clipped slightly near their base. The output voltage, at a point 35, is shown in Fig. 8(*e*).

Figures 1, 6:
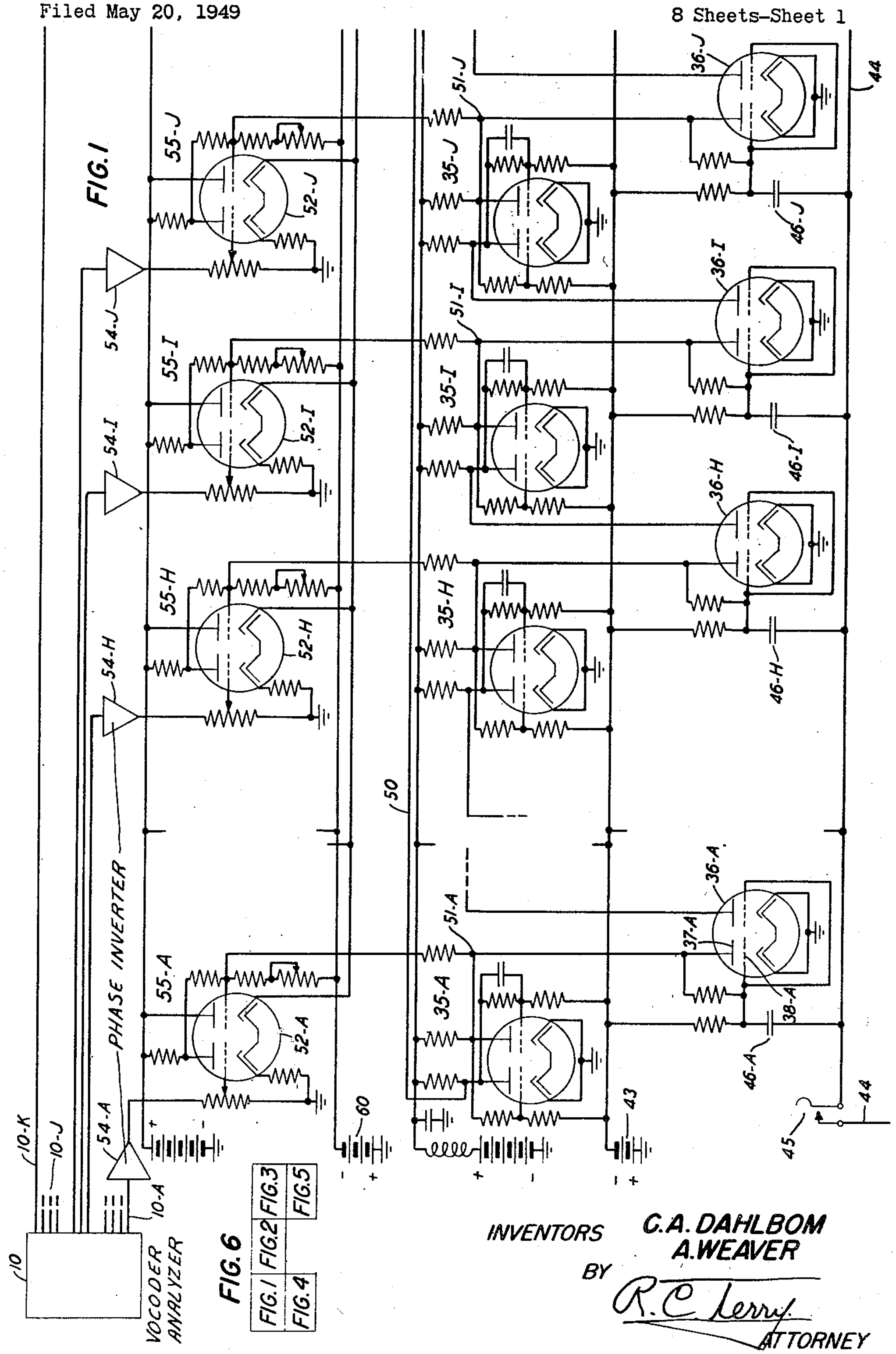
Fig. 6 represents the arrangement in which Figs. 1 through 5 should be combined as a composite circuit diagram.
Figure 2:
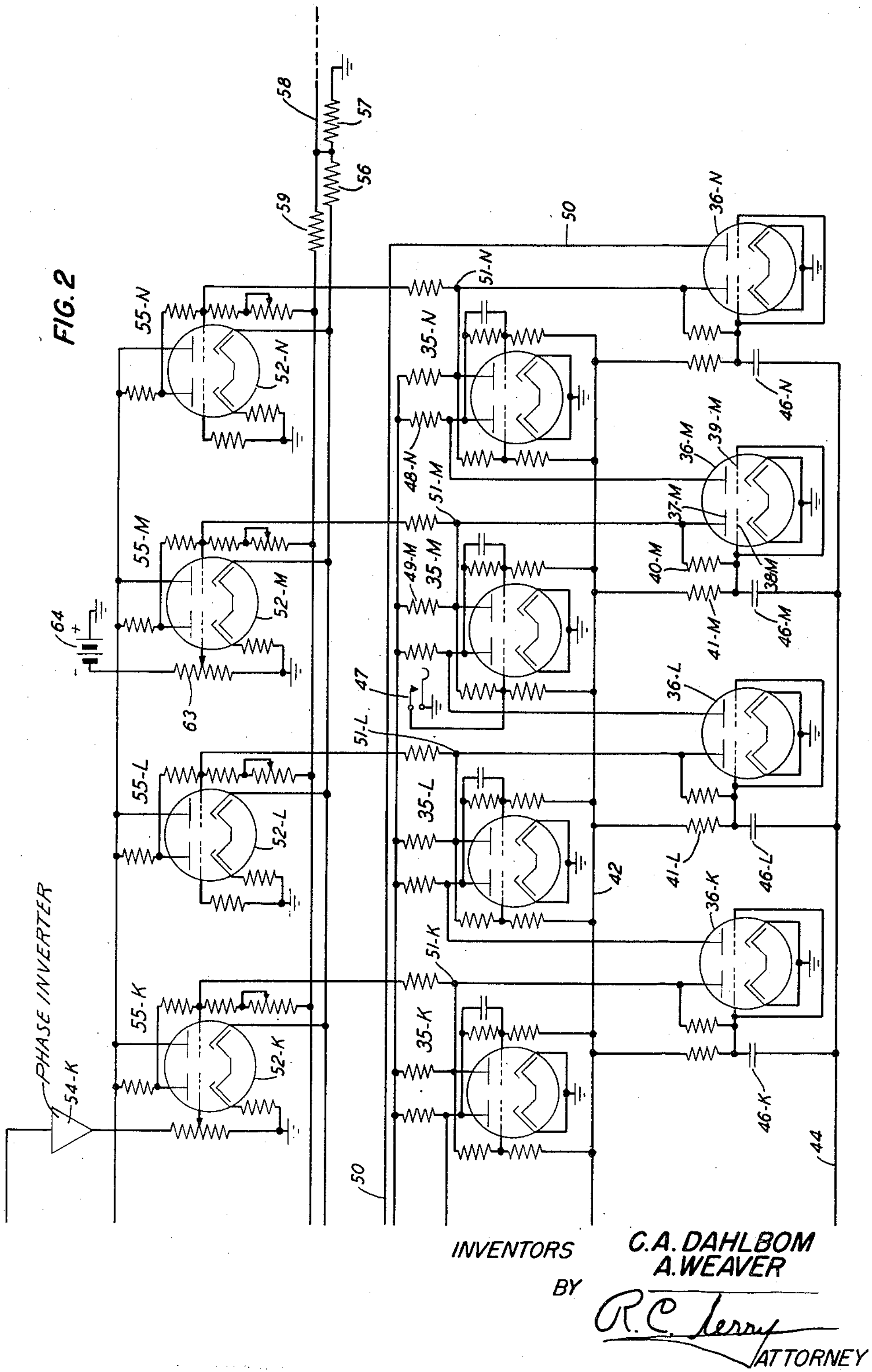

Shown in Figs. 1 and 2 is a series of gate voltage-generating circuits including a series of direct-current multivibrators having two conditions of stability, 35–A to 35–N, inclusive. For the sake of simplicity the multivibrators 35–B to 35–G and their associated circuits are omitted in the drawing.

Cooperating with the multivibrators, there is a series of prepare tubes, 36–A to 36–N, the action of which will be described. Each of the prepare tubes comprises a twin triode.

The circuit constants of the multivibrators 35–A to 35–N are so chosen that the right-hand tube of each multivibrator normally conducts and the left-hand tube is normally turned off. The action of the multivibrator 35–M and the prepare tube 36–M may first be considered. The output signal from this multivibrator is derived from its right-hand anode, which is connected to the left-hand anode 37–M of the prepare tube 36–M. The cathodes of the prepare tubes are grounded. The grids 38–M and 39–M of both halves of the prepare tube 36–M are connected together, and are biased below cut-off, being connected to the junction of a pair of resistors 40–M and 41–M, connected in series between the anode 37–M and a lead 42, which is connected to a source 43 of negative potential.

The output from the terminal 35 of the pulse amplifier 34 is connected via a lead 44 and a switch 45 through a condenser 46–M to both grids of the prepare tube 36–M. It is also connected via similar condensers to grids of the other prepare tubes.

When a multivibrator such as 35–M is in its normal condition, that is, when its right-hand half is conducting, neither half of the prepare tube 36–M will conduct, because its grids will be held below cut-off. Before starting the circuit, the switch 45 may be assumed to be open.

To start the circuit, the grid of the left-hand half of the multivibrator 35–M is grounded via a switch 47. As a result, its left-hand tube will be turned on and its right-hand tube will be cut off, and consequently the voltages on the anode of the right-hand tube of the multivibrator 35–M, the anode 37–M and the grid 38–M of the prepare tube 36–M, will all be changed in a positive direction. The condenser 46–M prevents the grids of the prepare tube from immediately rising in potential and they therefore rise gradually in potential as this condenser charges. It may be assumed that the circuit constants are such that if this condenser were allowed to charge in this manner to its maximum charge, the grids of the prepare tube would be just slightly too negative to allow conduction.

After closing the switch 47, the switch 45 is closed, thereby applying positive 25-microsecond voltage pulses to the grids of all prepare tubes via condensers 46–A to 46–N. The application of the first such pulse to the grids of the prepare tube 36–M causes both halves of this tube to conduct, inasmuch as this tube has been "prepared" by the previously-described actuation of the multivibrator 35–M. If there now occurs a 25-microsecond pulse, via the lead 44, applied to the grids through condenser 46–M, the prepare tube 36–M will conduct.

When the prepare tube 36–M conducts, it performs two functions; it triggers the next multivibrator 35–N, and it restores the multivibrator 35–M.

The triggering of the multivibrator 35–N results from the fact that the right-hand half of the prepare tube 36–M, upon conduction, draws current through the anode resistor 48–N of the left-hand half of the multivibrator 35–N, thereby lowering the voltage on the right-hand grid of this multivibrator.

The restoring of the multivibrator 35–N results from the fact that the prepare tube draws current through the anode resistor 49–M of the right-hand half of this multivibrator, thereby lowering the potential of the left-hand grid of this multivibrator.

By way of pointing out the ring arrangement of the multivibrators 35–A to 35–N it may be mentioned that the anode of the right-hand half of the prepare tube 36–N is connected via a lead 50 to the left-hand anode of the multivibrator 35–A.

Since a continuous series of 25-microsecond pulses is applied to the prepare tubes, the multivibrators 35–A to 35–N will be actuated individually in succession as a result of their ring arrangement and as a result of the previously-described action of the prepare tubes. The wave forms of voltages appearing at output points 51–K, 51–L, 51–M, 51–N, 51–A, and 51–B are shown in Figs. 8(*f*) to 8(*k*). The point 51–B, not shown in the drawing, corresponds to the right-hand anode of the multivibrator triggered by the prepare tube 36–A. The voltage wave forms in Figs. 8(*f*) to 8(*k*) are in the nature of gate voltages. The leading edge of the gate voltage from the multivibrator 35–N approximately coincides in time with the leading edge of the 25-microsecond pulse which energizes the prepare tube 36–M, and the trailing edge of this gate voltage approximately coincides in time with the leading edge of the 25-microsecond pulse which energizes the prepare tube 36–N, which will be the next pulse. Thus one pulse, acting through prepare tub 36–M, turns the multivibrator 35–N on, and the next pulse, acting through prepare tube 36–N, restores the multivibrator 35–N. The duration of each of the gate voltages will therefore be the repetition period of the pulses, 1/440 seconds. From any one gate voltage-generating circuit there will be produced one gate voltage for every fourteen pulses, since there are fourteen such circuits, sequentially energized by the pulses.

The operation of the gate circuits will now be described.

There are provided, in the illustrative circuit, a series of twin triode tubes 52–A to 52–N. The signals from the leads 10–A to 10–K of the analyzer 10 are applied via phase inverters 54–A to 54–K, each comprising a direct-current amplifier, to the left-hand grids of the tubes 52–A to 52–K, respectively.

The left-hand triodes of these tubes are in the nature of direct-current amplifiers. The right-hand triodes serve as the gate tubes proper.

These right-hand triodes, together with their associated input circuits, to be described, may be referred to as gate circuits 55–A to 55–N.

The circuit connections for the tubes 52–A to 52–K are all similar, and the action of tube 52–A will be described as typical. The connections and functions of tubes 52–L, 52–M and 52–N will be separately described.

The right-hand grid of the tube 52–A is connected to the junction point of three resistors which may be considered to comprise the arms of an adding circuit. One of these resistors is connected to a source 60 of negative bias potential. Another is connected to the output point 51–A of the multivibrator 35–A. The third is connected to the left-hand anode of the tube 51–A. In the absence of a positive gate voltage from the point 51–A, the right-hand grid of the tube 52–A is biased below cut-off, and hence, under this circumstance, voltage variations occurring in the lead 10–A cannot affect the right-hand half of the tube 55–A.

Upon the occurrence of a positive gate voltage from the gate generator 35–A, applied from the point 51–A to the right-hand grid of the tube 52–A, this tube is capable of conduction for the duration of the gate voltage. Under this circumstance the signal from the lead 10–A controls the current through the right-hand half of the tube 55–A. The cathodes of the right-hand halves of all the tubes 55–A to 55–N are connected together and have a common cathode circuit comprising resistors 56 and 57 in series. The end of the resistor 57 away from the cathodes is connected to ground. The transmission circuit, represented by a lead 58, is connected to the junction of the resistors 56 and 57. This junction point is connected via a resistor 59 to the source 60 of negative potential for biasing the transmission line to approximately zero potential. That is, even though at a given moment all the gate tubes may be supposedly cut off, a very small current may actually flow through one or more of them, and such a current in flowing through the resistors 56 and 57, would tend to raise the transmission line above zero potential if provision were not made for counteracting this effect.

It may be noted that, as is illustrated in Figs. 8(*f*) to 8(*k*), at any one moment only one of the gate generating circuits 35–A to 35–N may generate a positive gate voltage. When a positive gate voltage appears at the point 51–A the voltage in the lead 10–A, acting via the direct-current amplifier 54–A and the left-hand triode of the tube 52–A, will, as stated, control the current through the right-hand triode of the tube 52–A. This current, flowing through the resistors 56 and 57, will control the voltage on the line 58. The number of stages of amplification is such that an increase in the amplitude of the sound entering the analyzer will produce an increase in the voltage on the line 58.

As a result of the action of the fourteen gate-generating circuits, together with the gate circuits and the analyzer, there will periodically appear in the transmission line 58, in succession, a series of fourteen voltages. Ten of these voltages correspond to the direct-current voltages appearing at the output terminals 10–A to 10–J of the analyzer, representative of the energy which the speech signal has in ten frequency bands. The eleventh voltage will correspond to the voltage appearing at the terminal 10–K of the analyzer, representative of the pitch of the fundamental of the signal entering the analyzer. The twelfth, thirteenth and fourteenth voltages appearing in the line are used for synchronizing purposes and their generation by gate circuits 55–L, 55–M and 55–N will now be described.

It is desired that upon application of a gate voltage from the point 51–M to the right-hand grid of the tube 52–M, there appear in the transmission line a positive voltage pulse larger than any of the eleven voltages which might be applied to the line as a result of signals appearing at the output leads of the analyzer. As previously explained, in order that this pulse may be more readily identified at the receiver, it is desirable that it represent a large change of voltage on the line. For this reason it is advantageous to produce an approximately zero-voltage condition on the line immediately before and after the synchronizing pulse. That is, it is desired that when gate voltages are applied to the circuits 55–L and 55–N, an approximately zero-voltage condition appear on the line 58.

The circuits for the tubes 52–L, 52–M and 52–N are generally similar to those of the tubes 52–A to 52–K, except for the input circuits and voltages applied to their left-hand grids, and for values of circuit constants. That is, the right-hand grids of the tubes 52–L, 52–M and 52–N are connected to the junction points of resistor-type adding circuits, to the arms of which are applied gate voltages, negative bias voltage from the potential source 60, and a voltage from the left-hand anode of the tube in question. The right-hand triodes of all three tubes, 52–L, 52–M and 52–N are, like those of the tubes 52–A to 52–K, normally cut off.

The left-hand grids of the tubes 52–L and 52–N are, in the illustrative circuit, biased to ground. Current flows through the left-hand triodes of these tubes and consequently the voltage on the left-hand anodes of these tubes are considerably below the B-supply voltage. The right-hand grids of these tubes are biased considerably below cut-off. Circuit constants are so chosen that even when a positive voltage gate appears at the point 51–L or 51–N, little or no current flows through the right-hand half of the tube 52–L or 52–N, whereby approximately zero voltage appears at the input end of the line 58.

The left-hand grid of the tube 52–M is biased to a negative potential with respect to ground and with respect to the left-hand cathode of this tube by a source 64 of negative biasing potential and a variable potentiometer 63. Little or no current flows through the left-hand triode of the tube 52–M. As a result, the left-hand anode is maintained at a high positive potential, approaching the B-supply potential. Circuit constants are so chosen that upon the appearance of a positive gate voltage at the point 51–M, a large clurrent flows through the right-hand triode of the tube 52–M, thereby applying to the line 58 a positive voltage pulse considerably larger than any other voltages appearing on the line at various stages of operation. The amplitude of this positive pulse, which is used for synchronizing the gating system at the receiver with that at the transmitter, may be adjusted by adjustment of the potentiometer 63.

As previously mentioned, in Figs. 8(*f*) to 8(*k*) there are illustrated, in timed relation, the gate voltages appearing at the points 51–K, 51–L, 51–M, 51–N, 51–A, and 51–B of the corresponding gate voltage-generating circuits. It will be understood that successive gate voltages appear at the output points of the other gate voltage-generating circuits. The gate voltage at an output point of one of the gate voltage generators is initiated at the termination of the gate voltage from the preceding gate voltage generator.

In Fig. 8(*l*) there is illustrated the voltage applied to the line in response to energization of the successive gate circuits. The synchronizing pulse in Fig. 8(*l*) may be observed to be a large positive pulse in alignment with the gate voltage at the point 51–M shown in Fig. 8(*h*).

It may further be observed in Fig. 8(*l*) that the voltage applied to the line immediately before and after the synchronizing pulse is zero.

Upon the occurrence of the various gate voltages at points 51–A to 51–K, the voltage applied to the line is determined by the slowly varying direct-current voltages in the output terminal of the analyzer. As may be seen in Fig. 8(*l*), the voltage at the input end of the line changes rather abruptly as one gate circuit is deenergized and the next is energized.

*Receiving station—gate circuits*

Consideration may now be given to details of circuit elements at the receiving station.

Figure 3:
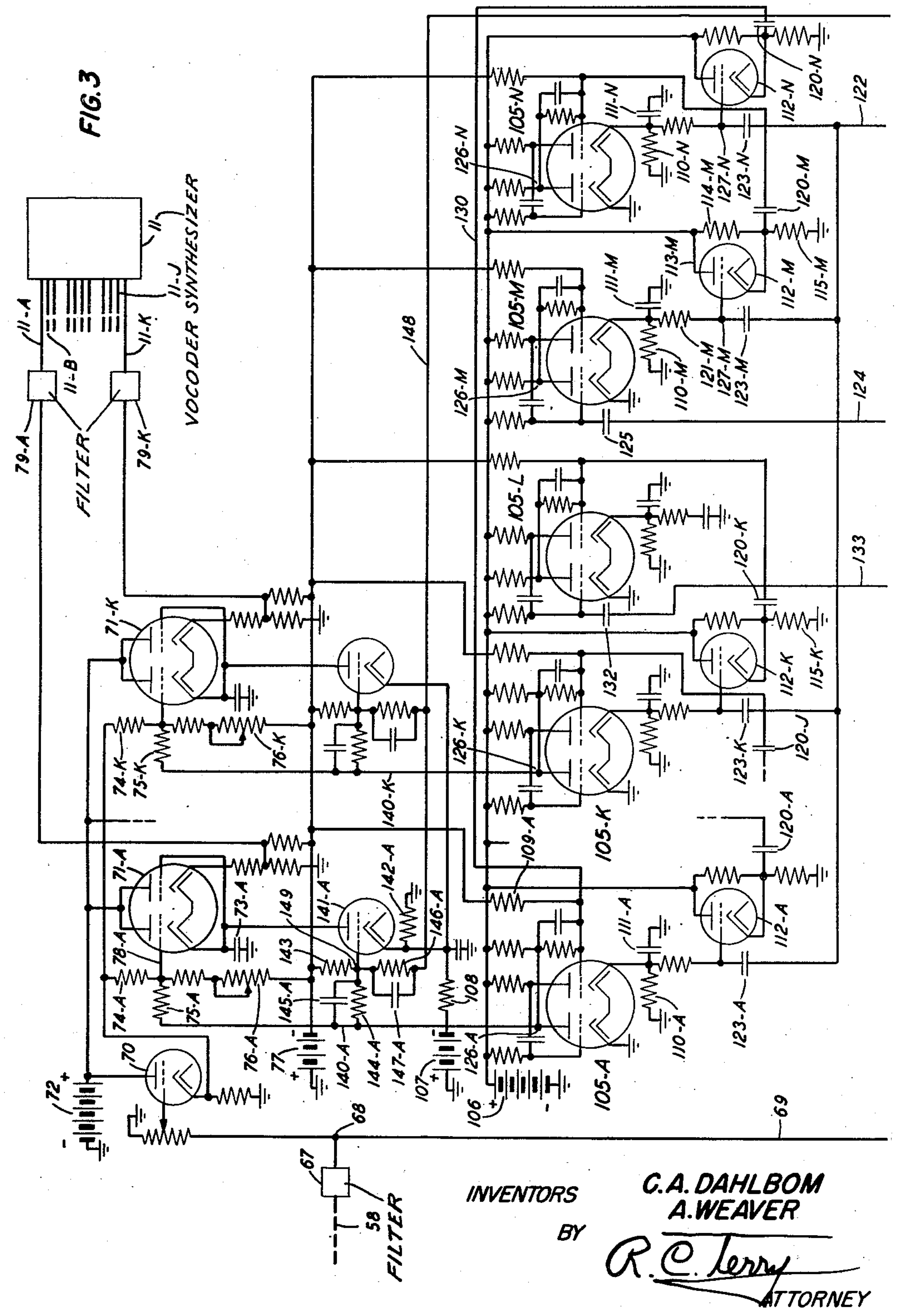

There is shown in Fig. 3 a synthesizer 11 having ten input terminals 11–A to 11–J, to which it is desired to apply voltages corresponding to those appearing at the terminals 10–A to 10–J of the analyzer. The voltages applied to the terminals 11–A to 11–J control the energy in various frequency bands of the synthesized signal. The synthesizer 11 is also provided with a terminal 11–K which controls the pitch of the synthesized signal. It is desired to apply to this terminal a voltage corresponding to that appearing at the terminal 10–K of the analyzer.

Although, as previously stated, the signal at the input end of the transmission line 58 changes abruptly as first one and then another gate circuit is energized, the transmission characteristics of the line 58 are necessarily such that abrupt changes of a voltage applied to the line at the transmitting station are, to some extent, smoothed out at the receiving end of the transmission line. As will be explained in more detail, the gate circuits at the receiver are energized for only a brief interval so as to sample only a mid-portion of the voltage transmitted by the corresponding gate circuit at the transmitter. Hence, in this respect, it is of no disadvantage that the line tends to smooth out the transmitted voltage, provided this mid-portion is not distorted by the line. The line will also tend to round the corners of the synchronizing pulse. In the synchronizing circuits to be described, a rounded synchronizing pulse is advantageous. In view of these considerations there may be provided at the receiving end of the transmission line a band-limiting filter 67 having such an attenuation-versus-frequency characteristic as to provide smoothing of the corners of the synchronizing pulse, in addition to the smoothing provided by the line. In Fig. 9(*a*) there is shown a configuration which the synchronizing pulse may assume at the output terminal 68 of the filter 67. Since Fig. 9(*a*) and the following figures relate primarily to synchronizing, only the synchronizing pulse is shown in Fig. 9(*a*). The broken lines indicate the omission of voltages transmitted by the gate circuits 55–A to 55–K.

The circuit constants of the filter 67 should be such as not to appreciably distort the mid-portion of the intelligence-conveying voltages.

Although, as explained, certain advantages may be derived from the use of the filter 67, in a modified embodiment this filter may be omitted, particularly if the transmission line or channel tends to act appreciably as a low-pass filter itself.

In still another embodiment, the filter 67 instead of being in series with the transmission line 58 itself, that is, to the left of the point 68, may be placed in series with only the branch 69 of the input circuit at the receiving station which leads to the synchronizing circuits, and not in series with the gate circuits. In this embodiment the filter 67 would not filter the signal applied to the gate circuits but would filter the signal applied to the synchronizing circuits.

The signal from the point 68 is applied through a cathode follower 70 to each of eleven gate circuits. Each gate circuit comprises a tube of the double triode type. These tubes are designated as 71–A to 71–K. The anodes of both triodes are connected to a positive source 72 of B-supply potential.

The triode 71–A may be considered as typical. A condenser 73–A is connected between the cathode of the left-hand triode and ground. The control grid 78–A of this left-hand triode is connected to a common junction point of three resistors, 74–A, 75–A and 76–A. The resistor 76–A is connected to a source 77 of negative biasing potential. The resistor 74–A is connected to the cathode of the previously-mentioned cathode follower 70. A positive 150-microsecond gate voltage is, by means to be described, applied to the resistor 75–A. In the absence of this gate voltage the negative bias voltage applied from the source 77 via the resistor 76–A to the control grid 78–A is sufficient to prevent conduction in the left-hand triode. Upon application of the positive 150-microsecond gate voltage to the grid 78–A via the resistor 75–A, conduction takes place. The three resistors 74–A, 75–A and 76–A act as an adding circuit and the net voltage applied to the control grid 78–A is proportional to the sum of the bias voltage, the gate voltage, and the output signal from the cathode follower 70. Since the gate voltage itself and the bias voltage do not change in value, it is the signal from the cathode follower 70 which will produce variations in the current through the gate tube. Means to be described are provided for discharging the condenser 73–A once per revolution of the distributing system at the receiver. This condenser will thereafter immediately be charged to a voltage dependent upon the voltage output from the cathode follower 70. That is, since the conducting interval of the left-hand triode of the gate tube is the same each time it receives a gate voltage, and since variations in the amplitude of the current which flows are determined by the signal derived from the cathode follower 70, the condenser 73–A will become charged to a voltage related to the signal from the cathode follower. In view of synchronizing features to be described, the voltage appearing on the condenser 73–A is related to the voltage appearing at the terminal 10–A of the analyzer.

The right-hand side of the tube 71–A comprises a cathode follower, and the voltage on the condenser 73–A is coupled to the input terminal of the synthesizer 11 via this cathode follower, and via a filter 79–A. It may be noted that there are no blocking condensers in the transmission circuit from the analyzer to the synthesizer. As a result direct-current signals may be transmitted.

Other channels connecting to leads 11–B to 11–K of the synthesizer are similar to the one just described.

*Synchronizing circuits at receiving station*

The synchronizing circuits at the receiver will now be considered. The signal from the transmission line 58, in addition to being applied to the cathode follower 70, is applied via the lead 69 and a blocking condenser 80 to the control grid of a biased-off clipper-differentiator tube 81. This tube comprises a pentode having high internal impedance, and having in its anode circuit an inductance 82. The current through the tube 81 will be proportional to the voltage applied to its grid. Since the voltage across an inductance is proportional to the time derivative of the current through the inductance, it follows that the output voltage from the anode of the tube 81 will, upon the application of the positive synchronizing pulse to the grid thereof, comprise a negative pulse corresponding to the leading edge of the synchronizing pulse followed by a positive pulse corresponding to the trailing edge of the synchronizing pulse.

In one satisfactory embodiment the synchronizing pulse is, as shown in Fig. 9(*a*), smoothed or rounded by the filtering effect of the transmission line 58 and by any other filtering means which may be employed, such as the filter 67, to such an extent that the resulting pulse has its greatest curvature toward its mid-portion. When such a pulse is differentiated and inverted, there is derived a wave such as that shown in Fig. 9(*b*), having maximum slope toward its mid-portion. As seen in this figure, the voltage at point 83 connected to the anode of the tube 81, comprises a negative pulse closely followed by a positive pulse, the trailing edge of the negative pulse merging into the leading edge of the positive pulse.

The output from the tube 81 is then applied to an amplifying and clipping tube 84. This tube clips at the negative extreme of the applied signal by going beyond cut-off and clips at the positive extreme of the applied signal by drawing grid current. There is shown in Fig. 9(*c*) the resulting voltage at a point 85, connected to the anode of the tube 84. This voltage comprises a square positive pulse immediately followed by a square negative pulse.

The output signal from the point 85 is applied to a differentiating circuit comprising a small series condenser 86 and a shunt resistor 87.

The resulting differentiated signal at a point 88 is shown in Fig. 9(*d*). It will be observed that this signal comprises a rather large negative pip appearing at a moment corresponding to the middle of the synchronizing pulse shown in Fig. 9(*a*). There are small positive pips corresponding to the positive-going portions of the wave shown in Fig. 9(*c*) but these pips are largely suppressed by the tendency for the succeeding stage to draw grid current. In any event they would be smaller than the negative pips.

This negative pip is then applied to a direct-current multivibrator 89 having two conditions of stability. As a result, an output terminal 90 of the multivibrator 89 is driven in a negative direction to a low positive potential, as shown in Fig. 9(*e*), and will remain at approximately this potential until the multivibrator is, at a subsequent moment, tripped to the other condition by means to be described.

The point 90 is resistively coupled to the control grid of a squelch tube 91, associated with an oscillator 92. The squelch tube may comprise the left-hand half of a double triode, the oscillator 92 including the right-hand half along with frequency-determining circuit means, such as a tank circuit 93. Both anodes may be connected directly to the B-supply voltage. The grid of the squelch tube is connected to a junction point of two series resistors between the point 90 and a source of negative bias potential. Depending upon the condition of the multivibrator 89, the grid of the squelch tube may be driven below or about cut-off. If the squelch tube 91 is cut off, it has no effect on the operation of the oscillator 92. This oscillator, which is of the Hartley type, will oscillate when the squelch tube is cut off. Under a condition when the multivibrator 89 drives the point 90 in a positive direction, the grid of the squelch tube will be driven to a potential at which this tube will conduct. The squelch tube 91 is, through the B-supply, connected in shunt with the tank circuit 93. When the squelch tube is in a conducting condition, its anode-to-cathode resistance acts as a low-resistance shunt across the tank circuit 93 to prevent oscillation of the oscillator 92.

Returning now to the operation of the squelch tube and oscillator in response to the reception at the receiving station of a synchronizing pulse from the line, it may be pointed out that when such a pulse is received and when the point 90 is driven in a negative direction by the multivibrator 89, the oscillator 92 will be started.

The output signal from the oscillator 92, derived from its cathode, is applied to the control grid of a cathode follower or orientation control tube 97. The output signal from this tube, derived from an adjustable slider 98 on a potentiometer-resistor in its cathode circuit, is shown in Fig. 10(*a*), and may be in the form of a sinusoid, the lower peaks of which are clipped off.

This signal is applied to the left-hand grid of an amplifier-clipper 99, comprising a twin triode. The common cathode circuit of the two triodes comprises an unbypassed resistor, which provides positive feedback and maintains the cathodes at a positive potential. The left-hand anode is coupled by a parallel resistor and capacitor to the right-hand grid. The right-hand grid is connected via a resistor to a source of negative bias potential. The bias on the respective grids is adjusted so that at the moment when the potential at the point 98 moves toward a less positive value through a critical point, for example, as shown in Fig. 10(*a*), the point of inflection between upper portion of the clipped sinusoid and the lower portion thereof, current in the left-hand triode of the amplifier-clipper 99 is cut off and current begins to flow in the right-hand triode. This condition is maintained until the potential at the slider 98 has passed through its lowest point and risen to a second critical point. In the illustrative embodiment this second critical point is between the lowermost value of the potential wave at the point 98 and the value where this wave passes upwardly through its point of inflection. When the voltage at the slider passes upwardly through this second critical point, the left-hand triode conducts and the right-hand triode is turned off. Because of the positive feedback, these transitions are sudden, producing a rectangular wave at a point 100 as shown in Fig. 10(*b*). The conduction period of the right-hand triode may satisfactorily be, say, two-thirds as long as that of the left-hand triode. As will be understood from subsequent description, the change of the voltage at the point 100 from positive toward negative is employed to generate a pulse which triggers the gate voltage-generating circuits. The points where these transitions take place may be adjusted by the slider 98, thereby providing proper phase adjustment of the gating system at the receiver with respect to the incoming signal.

The signal from the point 100 is then applied via a coupling condenser, to a pulse-generator or single-shot multi-vibrator 101 adapted to produce a positive 50-microsecond pulse at an output terminal each time its input control grid is driven in negative direction.

The output signal from this pulse generator at a point 102 is shown in Fig. 10(*c*).

This signal is then applied to each of two cathode followers 103 and 104.

There is provided, as shown in Fig. 3, a series of multivibrators 105–A to 105–N, inclusive, of the single-trip type. The multivibrators 105–B to 105–G, inclusive, have been omitted in the drawing to simplify the figure. Each of the illustrated multivibrators is shown as including a twin triode. A source 106 of positive potential supplies anode voltage for the various tubes. The right-hand grid of each multivibrator is biased negatively through individual resistors such as 109–A connected to a source 77 of negative potential. The left-hand grids are biased positively, being connected to the positive voltage source 106 through individual resistors. The positive bias on their left-hand grids, and the negative bias on their right-hand grids are such that the left-hand triodes of the multivibrators normally conduct and their right-hand triodes are normally cut off.

The right-hand anode of each multivibrator is coupled to the left-hand grid via a condenser. The left-hand anode is coupled to the right-hand grid via a parallel resistor-condenser combination. Circuit constants of the multivibrators are so chosen that they each will produce an output gate voltage of approximately 150-microseconds duration upon being triggered. That is, when the right-hand grid of one of the multivibrators is driven in a positive direction, the right-hand triode temporarily conducts and current in the left-hand triode is temporarily cut off, the multivibrator returning to its original condition automatically after 150 microseconds.

As will be explained below, all the multivibrators except 105–M are tripped by the application of positive pulses to their right-hand grids. The multivibrator 105–M, however, is tripped by its left-hand grid being driven in a negative direction.

The left-hand cathodes of the multivibrators are grounded and the right-hand cathodes are connected to ground via the parallel combination of a resistor and a condenser. The resistors may be designated as 110–A to 110–N and the condensers as 111–A to 111–N.

There are provided 13 prepare tubes 112–A to 112–K, inclusive, and 112–M and 112–N, connected between the various multivibrators in a manner to be described. No prepare tube is connected between the multivibrators 105–L and 105–M, as will be explained.

The prepare tube 112–M may be considered first by way of example. The anode 113–M of this tube is connected to the source 106 of positive potential. Its cathode is biased above ground by being connected to the junction point of a pair of resistors 114–M and 115–M, connected in series between the positive source 106 and ground. The cathode is also coupled via a blocking condenser 120–M to the right-hand grid of the multivibrator 105–N.

The grid of the prepare tube 112–M is connected via a resistor 121–M to the right-hand cathode of the multivibrator 105–M.

Let it be assumed, as an initial condition, that the left-hand triodes of all the multivibrators 105–A to 105–N are conducting, and their right-hand triodes are not conducting. It may also be assumed that the oscillator 92 is not oscillating. As previously mentioned, upon the occurrence of a synchronizing pulse, the output point 90 of the multivibrator 89 suddenly changes to a less positive potential. The change in potential of the point 90 produces two effects; it triggers the multivibrator 105–M, as will be explained, and it drives the grid of the squelch tube 91 in a negative direction below cut-off, thereby starting the oscillator.

When the oscillator is started, a series of positive 50-microsecond voltage pulses, having a repetition rate of, for example, 440 pulses per second, is applied by the cathode follower 103 through a lead 122, and through condensers 123–A to 123–K, inclusive, 123–M, and 123–N, respectively, to the grids of the prepare tubes 112–A to 112–K and 112–M and 112–N, respectively.

The potential on the grid of the prepare tube 112–M, will be substantially zero or ground, so long as the right-hand triode of the multivibrator 105–M is not conducting. As long as the grid of the prepare tube is held at ground potential due to the non-conduction of the right-hand triode of the multivibrator 105–M, the prepare tube will be cut off. That is, the positive bias voltage applied to the cathode of the prepare tube as a result of the voltage divider action of the resistors 114–M and 115–M is sufficiently great to maintain this prepare tube cut off, even in the presence of the 50-microsecond voltage pulses applied to its grid, so long as the voltage applied from the cathode of the multivibrator 105–M to the grid of the prepare tube is substantially zero. It therefore follows that under the assumed initial condition, when the right-hand triodes of all the multivibrators are cut off, the application of a 50-microsecond pulse to the grids of all the prepare tubes has no significant effect. A given prepare tube will respond to a 50-microsecond pulse from the lead 122 only if the prepare tube has first been "prepared" by having its grid potential changed in a positive direction by the preceding multivibrator.

When, upon the occurrence of a synchronizing pulse in the transmission line 58, the potential at the point 90 changes in a negative direction, as shown in Fig. 9(*e*), and since this point is capacitively coupled via a lead 124 and a condenser 125 to the left-hand grid of the multivibrator 105–M, this grid will be temporarily driven negatively. As a result, this multivibrator is energized so that its left-hand triode is cut off and its right-hand triode conducts. Being of a single-trip type, however, this condition exists for only a brief interval, depending upon the circuit constants. The circuit constants are, as stated, so chosen that this condition exists for approximately 150 microseconds, for example. The voltage at a point 126–M connected to the left-hand anode of this multivibrator is shown in Fig. 10(*f*). As a result of the conduction of the right-hand triode of the multivibrator 105–M, the condenser 111–M becomes charged. Its charge can leak off gradually through the resistor 110–M and also to some extent through the resistor 121–M. The circuit constants are so chosen that this condenser 111 will substantially discharge in less than one complete revolution of the distributor or gating system.

As a result of the temporary conduction of the right-hand triode of the multivibrator 105–M, the voltage at a point 127–M connected to the grid of the prepare tube 112–M tends to rise rather rapidly to a maximum value and then decline slowly. Superposed upon this rather rapid rise and slow decline there is the added effect of the voltage pulses from the lead 122 applied via the condenser 123–M. The overall effect at the point 127–M is shown in Fig. 10(*d*). Considering Fig. 10(*d*) in connection with Fig. 9(*e*) and Fig. 10(*f*), it may be observed that the voltage at the point 127–M begins to rise at the moment when the multivibrator 105–M is triggered by the voltage from the point 90. The circuit constants, including those of the resistors 121–M and 110–M, and condensers 123–M and 111–M, are so chosen that the voltage at the point 127–M continues to rise after the multivibrator 105–M has returned to its original condition; more particularly, the voltage at the point 127–M tends to reach a maximum value at approximately the moment when the first 50-microsecond pulse occurs, following the triggering of the multivibrator 105–M. The point 127–M then tends to discharge to its quiescent voltage within less than a complete revolution of the gating system, for example in about seven or eight full oscillation periods of the oscillator 92.

The temporary conduction of the right-hand triode of the multivibrator 105–M thus temporarily biases the grid of the prepare tube 112–M to a positive potential for a period of time following the termination of conduction in the right-hand triode of the multivibrator 105–M. Under this condition, the prepare tube 112–M, having been "prepared," will now respond to the next 50-microsecond positive voltage pulse applied from the lead 122 via the condenser 123–M to its grid. That is, the bias temporarily applied by the multivibrator 105–M to the grid of the prepare tube 112–M is sufficiently positive with respect to ground that upon the occurrence of a 50-microsecond pulse, the grid will be driven into the region where anode current will flow through the prepare tube.

When the prepare tube conducts, its cathode will be driven in a positive direction, because of the increase in current flowing through the resistor 115–M. A positive pulse will be applied from this cathode through the coupling condenser 120–M to the right-hand grid of the multivibrator 105–N. As a result the multivibrator 105–N will be triggered, so that its right-hand triode conducts. The voltage wave form at a point 126–N connected to the left-hand anode of the multivibrator 101–N is shown in Fig. 10(*g*).

The triggering of the multivibrator 105–N will temporarily bias the grid of the prepare tube 112–N to a sufficiently positive potential with respect to ground that the next 50-microsecond pulse from the lead 122 will cause conduction in the prepare tube 112–N. The voltage at a point 127–N connected to the grid of the prepare tube 112–N is shown in Fig. 10(*e*).

It may be noted that the cathode of the prepare tube 112–N is coupled via a blocking condenser 120–N and a lead 130 to the right-hand grid of the multivibrator 105–A. The multivibrator 105–A, upon being triggered, prepares the prepare tube 112–A. The gate voltage produced at a point 126–A connected to the left-hand anode of the multivibrator 105–A is shown in Fig. 10(*h*). The prepare tube 112–A is coupled via a condenser 120–A to the right-hand grid of the multivibrator 105–B, not shown. Prepare tubes 112–B to 112–J, inclusive, also not shown, are operatively associated with multivibrators 105–B to 105–J, inclusive, in the same manner as prepare tubes 112–M, 112–N, and 112–A are associated with multivibrators 105–M, 105–N, and 105–A, respectively. The cathode of the prepare tube 112–J is coupled via a blocking condenser 120–J to the right-hand grid of the multivibrator 105–K. The multivibrator 105–K is followed by a prepare tube 112–K and is adapted to prepare it in the same manner that other multivibrators prepare their prepare tubes. After the prepare tube 112–K has been prepared by the multivibrator 105–K, it responds to the next 50-microsecond pulse applied to its grid, and causes the right-hand triode of the multivibrator 105–L to conduct. The resulting drop in the potential of the right-hand anode is applied via a coupling condenser to the left-hand grid of this multivibrator, thereby driving this grid negative and cutting off the left-hand half of the tube. The left-hand grid is coupled via a condenser 132 and a lead 133 to the right-hand grid of the pulse generator 89. As a result, a negative pulse is applied to the right-hand grid of this pulse generator, driving the right-hand anode of this pulse generator toward a more positive potential as shown in Fig. 9(*e*). Since this right-hand anode is coupled to the grid of the squelch tube 89, the potential of this grid is changed in a positive direction, thereby stopping the oscillator, as shown in Fig. 10(*a*).

It will be noted that no prepare tube follows the multivibrator 105–L. Since the ring of multivibrators is, in a sense, broken between the multivibrators 105–L and 105–M, this arrangement of multivibrators may be considered to be in the form of an open-ended ring.

By way of summary of the operation of the oscillator-controlled gate voltage-generating system at the receiver, it may be stated that the synchronizing pulse from the line acts to trigger the multivibrator 105–M, and also to start the oscillator. After the multivibrator 105–M has been triggered, the 50-microsecond pulses, derived from the oscillator and pulse-generating circuits, cooperate with the prepare tubes to cause succession multivibrators to be triggered. The triggering of the last multivibrator in the ring, namely, 105–L, serves to stop the oscillator, which remains stopped until the appearance of the next synchronizing pulse on the line.

The output voltages from the multivibrators 105–A to 105–K, which are in the nature of a train of 11 sequential 150-microsecond positive gate voltages, are derived from the left-hand anodes of these multivibrators and appear in leads 140–A to 140–K, inclusive. Leads 140–B to 140–J are omitted in the drawing. It will be noted that these 150-microsecond gate voltages which actuate the gating system at the receiver are of considerably shorter duration than the corresponding gate voltages at the transmitter, which, as stated, are 1/440 second in length, for example. Moreover, the gate voltages at the receiver are phased to occur toward the mid-portions of the time intervals during which the individual intelligence-transmitting or significant voltages are received. This phasing may be adjusted by adjustment of the slider 98 of the potentiometer in the cathode circuit of the orientation control tube 97.

The leads 140–A to 140–K are connected to the resistors 75–A to 75–K, respectively. These resistors, as previously mentioned, are parts of the adding circuits which produce sum voltages applied to the left-hand grids of the gate tubes 71–A to 71–K.

The multivibrators 105–L, 105–M and 105–N, are, as mentioned, employed for synchronizing purposes, and voltages which they generate, for example, those shown in Figs. 10(*f*) and 10(*g*), are not applied to any gate circuits.

Considering gate tube 71–A as an example of other gate tubes, it may be recalled from previous explanation that when a 150-microsecond gate voltage is applied via the lead 140–A to its left-hand grid, its left-hand triode conducts, allowing the condenser 73–A to be charged to a voltage determined by the voltage then appearing in the transmission line 58. In a similar manner, the other 10 gate tubes 71–B to 71–K are energized in succession, and serve to charge up their condensers 73–B to 73–K. The voltages on these condensers are applied through cathode followers comprising the right-hand halves of the tubes 71–A to 71–K, to the input terminals 11–A to 11–K of the synthesizer 11.

Means are provided for discharging the condensers 73–A to 73–K periodically. It may be seen that such means are needed from a consideration of the fact that the left-hand triodes of the gate tubes represent a one-way path, through which the condensers may be charged but not discharged, and hence when the magnitude of the signal voltage received from the line 58 decreases from a previous larger value, unless some discharge path were provided for condensers such as 73–A, the voltage on these condensers would not follow the signal voltage. There is therefore provided, for periodically discharging each of the condensers such as 73–A, a canceller tube such as 141–A. This tube comprises a triode essentially in parallel with the condenser 73–A.

The anode of this canceller tube is connected to the upper plate of this condenser, that is, to the left-hand cathode of the gate tube 71–A. The cathode of the canceller tube 141–A is connected to a potentiometer comprising a resistor 142–A connected to ground and a resistor 108 connected to the source 107 of negative bias voltage.

The grid of the canceller tube 141–A is connected to the junction point of an adding circuit having three arms. One arm of this adding circuit comprises a resistor 143–A connected to the source 77 of negative potential. Another arm comprises a resistor 144–A and a condenser 145–A, connected in parallel between the grid and the lead 140–A from the anode of the left-hand triode of tube 105–A. A third arm comprises a resistor 146–A and a condenser 147–A, connected in parallel between the grid and a lead 148 from the cathode of the cathode follower tube 104.

The resulting voltage applied to the grid of the canceller tube 141–A is normally sufficiently negative that this tube will conduct only when a positive 50-microsecond pulse from the cathode follower 104 is applied through the lead 148 to the grid of the canceller tube during the occurrence of a positive 150-microsecond gate voltage applied from the multivibrator 105–A through the lead 140–A.

A 50-microsecond pulse occurs at the beginning of each of the 150–microsecond gate voltages, because, as has been explained, it is the leading edge of the 50-microsecond pulses which triggers the multivibrators which produce these 150-microsecond gates.

On the grids of the canceller tubes the 50-microsecond pulses and the 150-microsecond gates are superposed as shown in Fig. 10(*i*), which represents the voltage at a point 149 connected to the grid of the canceller tube 141–A. Any one canceller tube will discharge its associated condenser only once per revolution of the electronic distributor, namely, at the beginning of the gate voltage applied to its associated gate circuit. The 50-microsecond pulses from the lead 148 will be incapable of causing the canceller tube to conduct at other times because of the fact that it is only during coincidence of a 150–microsecond gate and a 50-microsecond pulse added together on its grid that the grid of the canceller tube is in a potential zone where the tube will conduct.

The condenser will thus be substantially completely discharged, periodically.

*Summary of operation*

By way of recapitulation, it may be stated that at the transmitting station, shown in Figs. 1, 2 and 4, a voice signal or other sound signal is applied to the analyzer 10, and there is generated at terminals of the analyzer a series of significant voltages representative of the energy in various frequency bands of the voice signal. These voltages are applied in succession to the transmission line 58, along with a synchronizing pulse, with the aid of an electronic commutator including the series of gate circuits 55–A to 55–N. These gate circuits are actuated by sequential gate voltages occurring one immediately after another, generated by the series of multivibrators 35–A to 35–N. The multivibrators are controlled with the aid of a series of prepare circuits by voltage pulses derived from the oscillator 24.

Figure 5:
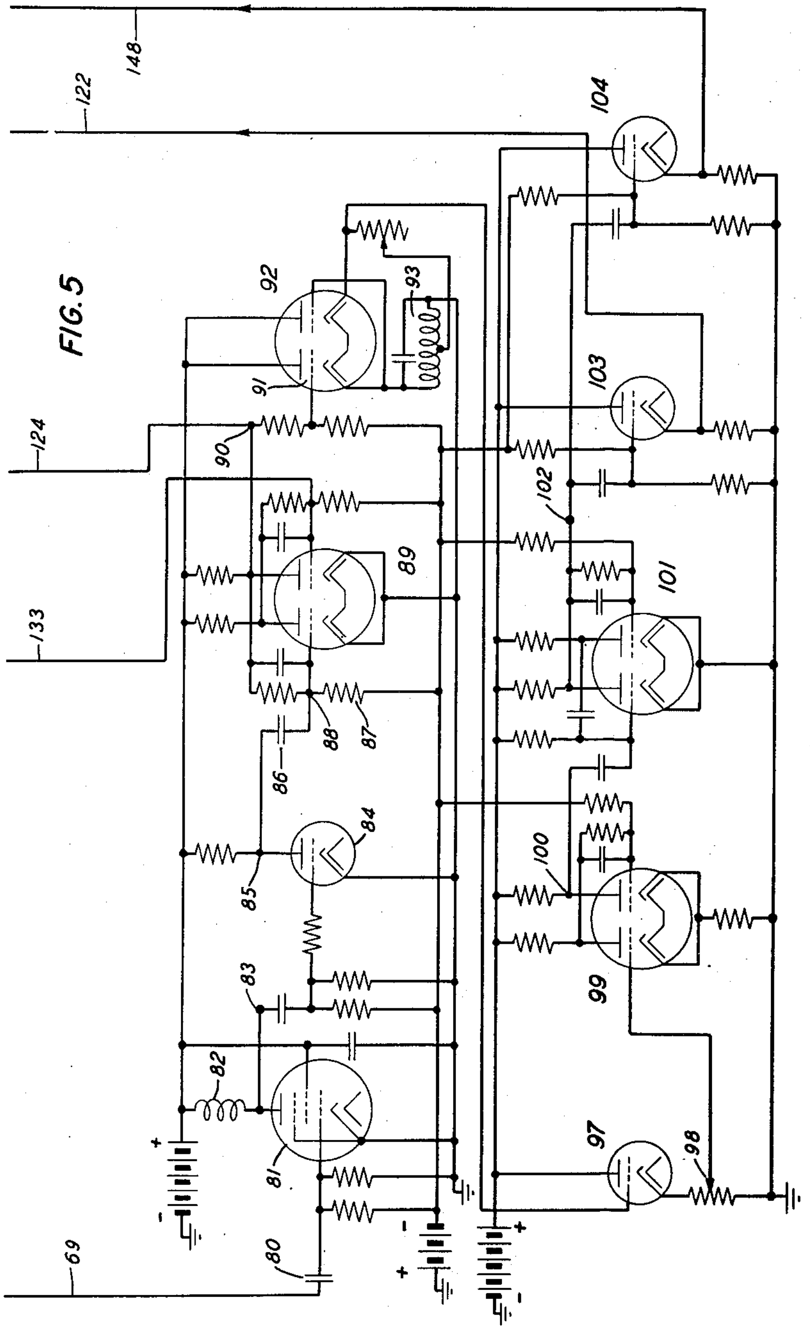

At the receiver, shown in Figs. 3 and 5, the significant voltages are applied, with the aid of an electronic distributor synchronized with the commutator at the transmitter, to the appropriate input terminals of the synthesizer 11, which synthesizes a sound signal similar to the original sound signal. The gating functions of the distributor are performed by gate circuits including the left-hand triodes of the tubes 71–A to 71–K. When one of these triodes conducts, in response to a positive gate voltage applied to its grid, a condenser in its cathode circuit, for example, 73–A, becomes charged to approximately the voltage then on the line, and holds this charge until subsequently discharged by its associated canceller tube. The voltage on the condenser is applied continuously via a cathode follower to the synthesizer 11.

In order to generate properly-timed gate voltages at the receiver, the received synchronizing pulse is filtered, differentiated, squared, and differentiated again to obtain a sharp pulse. This pulse is used to produce a voltage which triggers the first multivibrator 105–M in a composite chain of single-shot multivibrators and prepare circuits and which starts an oscillator 92 for generating voltage pulses which in turn, with the aid of the prepare tubes, actuate the multivibrators in sequence. These multivibrators apply gate voltages to the gate circuits at the receiver, and the triggering of the last multivibrator stops the oscillator. The last-mentioned voltage pulses also actuate the canceller tubes for discharging the condensers individually, immediately prior to the charging of the condenser to a new voltage.

It may be noted from the description of the gating system at the transmitter that the primary function of the gate circuits 55–L and 55–N is to provide, on the transmission line, a condition which will contrast markedly with the condition provided when the gate circuit 55–M is actuated. Thus, as has been described, when the gate circuits 55–L and 55–N are actuated, a zero-voltage condition may be produced on the line, which will be in marked contrast to the high positive voltage on the line produced when the gate circuit 55–M is actuated. In a somewhat different embodiment from that which has been described, the gate circuits 55–L and 55–N together with the tubes 52–L and 52–N may be omitted altogether, the line being biased to some predetermined potential, such as zero voltage, which will contrast markedly with its potential voltage when the gate circuit 55–M is actuated. In such an embodiment the gate-generating circuits 35–L and 35–N would remain in the circuit, and during the time when they are actuated, the line would assume the potential to which the line is biased. Thus with the line biased to ground, the positive synchronizing pulse produced by the gate circuit 55–M could be readily identified. Such an embodiment would therefore operate satisfactorily despite the elimination of tubes 52–L and 52–N.

As another possible modification, privacy could be achieved by altering the order of the connections from the analyzer to the gate circuits in the transmitter, and correspondingly altering the order of the connections in the receiver to the synthesizer.

While the invention is particularly useful in connection with voice communication systems, it is also applicable to telemetering systems, and to synchronizing systems generally. In applying the principles of the invention to a telemetering system, the leads 10–A to 10–K, instead of being output leads from an analyzer, may represent leads from output terminals of 11 different devices, each of the devices including sensing means and means for generating at an output terminal a voltage instantaneously corresponding to the condition of the sensing means. For example, the sensing means may comprise a device for measuring temperature, pressure, voltage, current, power, sound, light, velocity, acceleration, distance, angular displacement, intensity of radiation, or the like. If, at a remote receiving station, the leads 11–A to 11–K are connected individually to voltage-responsive indicating devices, the system will serve to transmit, over a common channel, telemetering information from a plurality of sensing devices to a plurality of indicating devices.

It will be understood that instead of gate circuits of the specific type illustrated and described herein, there might be employed other types of gate circuits having an output terminal, a first input terminal to which there may be applied an input signal, and a second input terminal to which there may be applied a gate signal, the circuit being adapted to generate at the output terminal, upon the occurrence of the gate signal, an output signal determined by the input signal.

The cyclic speed of the electronic commutator and distributor described herein should be sufficiently high that changes in the significant voltages applied to the gate circuits at the transmitter will be small during one revolution of the commutator.

While a suitable form of apparatus and method to be used in accordance with the invention have been described in some detail, and certain modifications have been suggested, it will be understood that numerous changes may be made without departing from the general principles and scope of the invention.

What is claimed is:

1. In a communication system having a transmitting station and a receiving station, in combination, a signal analyzing instrumentality at said transmitting station for generating a plurality of voltages having characteristics respectively representative of a like plurality of characteristics of an original signal, a signal synthesizing device at said receiving station adapted to receive signals corresponding to said voltages and to re-create under the control of said received signals a signal corresponding to said original signal, means including an electron discharge gating system at each of said stations for transmitting said voltages from said analyzer to said synthesizer in sequence over a common transmission channel, driving means individual and local to said gating systems, and means for synchronizing said gating systems.

2. Apparatus as in claim 1 in which said gating system at at least one of said stations includes a gate circuit for each of said voltages, and a source of sequential gate voltages for application to said respective gate circuits.

3. Apparatus as in claim 1 in which said gating system at said transmitting station includes a voltage-controlled gate circuit for each of said voltages, a plurality of multivibrators connected in a closed ring-like arrangement for applying sequential gate voltages to said gate circuits, and a source of periodic signals for controlling the operation of said multivibrators.

4. Apparatus as in claim 1 including at said receiving station a plurality of condensers, means coupling said condensers individually to said synthesizer, a plurality of gate circuits individually coupling said transmission channel to said condensers, and means for discharging said condensers.

5. In a communication system having a transmitting station and a receiving station, in combination, a communication channel interconnecting said stations, a signal analyzing instrumentality at said transmission station for generating a plurality of voltages having characteristics respectively representative of characteristics of an original signal, means for transmitting said voltages in sequence over said channel, a signal synthesizing device at said receiving station adapted to receive signals corresponding to said voltages and to re-create under the control of said received signals a signal corresponding to said original signal, a plurality of condensers at said receiving station, means coupling said condensers individually to said signal synthesizing device, a plurality of gate circuits individually coupling said condensers to said transmission channel to pass charges to said condensers according to said received signals, a plurality of canceller tubes individually connected in parallel with said condensers, each of said canceller tubes being adapted, when actuated, to cancel the signal stored in its associated condenser by discharging said condenser substantially completely, means including an oscillator at said receiving station for generating periodic signals, means responsive to said periodic signals for actuating said gate circuits in sequence, and means responsive to said periodic signals for actuating said canceller tubes in sequence.

6. In a communication system having a transmitting station, a receiving station, and a transmission channel, in combination, means at said transmitter for generating a plurality of separate signals, an electronic commutator including a plurality of gate circuits at said transmitter for transmitting said signals in succession over said transmission channel, a plurality of additional gate circuits at said transmitter having input terminals and having output terminals connected to said transmission line, means for applying bias voltages to said input terminals, said bias voltages applied to at least two of said input terminals being of different values, a source of sequential gate voltages for controlling all said gate circuits at said transmitting station so as to operate said electronic commutator at a controlled rate and to cause said additional gate circuits to transmit a synchronizing voltage pulse, receiving means at said receiving station having a plurality of control terminals, and an electronic distributor at said receiving station operable in cycles initiated by said synchronizing pulse for connecting said transmission channel to said control terminals in succession.

7. In a communication system of the type including a transmitter, a source of a plurality of separate signals in said transmitter, a communication channel, means in said transmitter for applying said signals in sequence to said channel, a receiver, and a plurality of terminals within said receiver, an electronic distributor in said receiver for applying said signals to said respective terminals, comprising, in combination, a plurality of stepping circuits, a plurality of prepare circuits, said prepare circuits being arranged to interconnect successive stepping circuits to form a composite chain of circuits, means responsive to a repeated characteristic of said signals received from said transmission channel for triggering a first of said stepping circuits, an oscillator coupled to said prepare circuits for applying triggering signals thereto, each of said prepare circuits being adapted to allow triggering of the succeeding stepping circuit only after the preceding stepping circuit has first been triggered and when thereafter a triggering signal is received by said prepare circuit from said oscillator, and a plurality of gate circuits sequentially actuatable by said respective stepping circuits, said gate circuits being individually connected between said communication channel and said respective terminals.

8. In combination, a source of periodic voltage pulses, a plurality of gate voltage generators controlled by said voltage pulses, a plurality of prepare circuits, a connection from each of said prepare circuits to one of said gate voltage generators over which the prepare circuit receives a gate voltage, connections from said voltage pulse source to all of said prepare circuits over which said prepare circuits are pulsed, and a connection from each of said prepare circuits to another of said gate voltage generators over which to trigger the latter responsive to coincidence of said gate voltage and the pulsing by said source.

9. In a communication system including a transmitter, a receiver and means at said transmitter for transmitting a synchronizing pulse to said receiver, in combination at said receiver, a plurality of single-shot multivibrators, a plurality of coincidence circuits, coupling means interconnecting said multivibrators and said coincidence circuits into a composite chain, means responsive to said synchronizing pulse for triggering a first of said multivibrators, an oscillator for generating a train of triggering signals, means responsive to said synchronizing pulse for starting said oscillator, means for stopping said oscillator after a predetermined number of oscillations, means for applying said triggering signals to said coincidence circuits, and delay means associated with the coupling means between each multivibrator and the succeeding coincidence circuit for delaying the transfer to the coincidence circuit of a transient preparing signal resulting from the triggering of the multivibrator until the maximum amplitude of said transient preparing signal concurs with a triggering signal applied to said coincidence circuit to trigger the next multivibrator.

10. In a transmitter for transmitting a plurality of individual signals and a synchronizing voltage pulse in succession over a common transmission channel, in combination, a plurality of gate circuits, means for applying said signals to said gate circuits, an additional gate circuit, means for applying a unidirectional voltage to said additional gate circuit, all of said gate circuits being connected to said transmission channel, a closed ring of multivibrators interconnected via coincidence circuits, each of said coincidence circuits being adapted, after its preceding multivibrator has been energized, to energize the succeeding multivibrator upon application of a triggering pulse to said coincidence circuit, a source of periodic triggering pulses for said coincidence circuits, adapted to cause said multivibrators to be energized one at a time, in sequence, for generating sequential gate voltages, and means for applying said gate voltages individually to all of said gate circuits.

References Cited in the file of this patent

UNITED STATES PATENTS

| | | |
|---|---|---|
| 2,098,956 | Dudley | Nov. 16, 1937 |
| 2,412,974 | Deloraine | Dec. 24, 1946 |
| 2,414,265 | Lawson | Jan. 14, 1947 |
| 2,443,198 | Sallach | Jan. 15, 1948 |
| 2,454,815 | Levy | Nov. 30, 1948 |
| 2,457,986 | Edson | Jan. 4, 1949 |
| 2,471,138 | Bartelink | May 24, 1949 |
| 2,475,625 | Lyons | July 12, 1949 |
| 2,485,886 | Johnstone | Oct. 25, 1949 |
| 2,486,391 | Cunningham | Nov. 1, 1949 |
| 2,486,491 | Meacham | Nov. 1, 1949 |
| 2,527,638 | Kreer | Oct. 31, 1950 |
| 2,541,023 | Beatly | Feb. 13, 1951 |
| 2,543,736 | Trevor | Feb. 27, 1951 |